United States Patent Office 3,315,811
Patented Apr. 25, 1967

3,315,811
CENTRIFUGAL MACHINE WITH BUILT-IN PLOW
Andre Mercier, La Madeleine, and Roger Josien, Annappes, France, assignors to Fives Lille-Cail, Paris, France
Filed Feb. 18, 1965, Ser. No. 433,661
Claims priority, application France, Feb. 27, 1964, 965,304, Patent 1,394,980
10 Claims. (Cl. 210—375)

This invention relates to the separation of solids and liquids by centrifugal forces, and particularly to the removal of a cake of solids from the basket of a centrifugal machine.

It is known to equip centrifugal machines of the overhead suspension type with a plow for separating a cake from the inner walls of the basket. The plow travels axially along the circumferential wall while the basket is slowly rotated to dislodge and break the major portion of the cake, and the plow ultimately approaches the bottom wall of the basket closely enough to scrape the bottom wall and to rake the previously broken pieces of the cake into a central aperture of the bottom wall from which they are discharged by gravity.

The aperture is normally closed by a valve which is axially movable in the basket and is lifted from the bottom wall when it is desired to open the aperture. The radial dimensions of the valve are necessarily greater than those of the aperture. In order to avoid interference between the axial movement of the plow and the valve, their paths are radially offset in the known centrifugal machines, and an annular portion of the bottom wall about the discharge aperture which is not reached by the plow must be cleared manually of accumulated solids from time to time.

The primary object of the invention is the provision of a centrifugal machine equipped with a permanently installed plow which can clear the entire internal surface of the basket from accumulated solids.

With this object and others in view, as will hereinafter become apparent, the invention, in one of its aspects, resides in a centrifugal machine of the afore-described general type in which the radially outermost portion of the valve is spaced radially outwardly from the central aperture of the bottom wall when the valve is in its position of engagement with that wall, and at a predetermined distance from the axis of the basket. The plow, in addition to being arranged for axial movement in the basket, is also radially movable between an inoperative position in which it clears the axial path of the valve, and an operative position in which a portion of the plow blade extends into the path of the valve and the spacing of the blade portion from the basket axis is smaller than the aforementioned predetermined distance.

Other features and many of the attendant advantages of this invention will be readily appreciated as the same is better understood from the following detailed description of a preferred embodiment when taken with the accomanying drawing in which.

Figure 1:
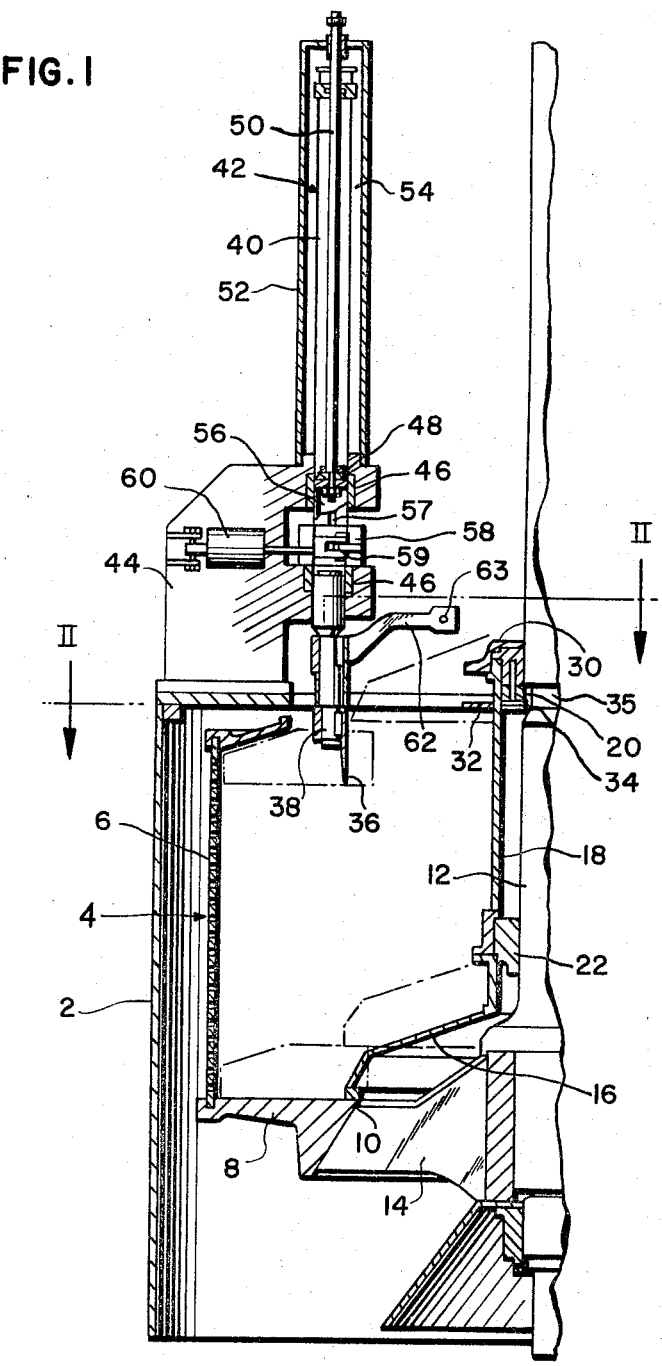
FIG. 1 shows one half of a centrifugal machine of the invention front elevational section on the basket axis, portions of a valve-lifting mechanism having been omitted for the sake of clarity.

Referring now to the drawing, and initially to FIG. 1, there is seen the stationary curb or receptacle 2 of a centrifugal machine whose support structure is not otherwise shown, and may be conventional. A basket 4 is rotatably mounted in the receptacle. It has a substantially cylindrical, perforated side wall 6 and a bottom wall 8 with a central aperture 10.

The basket 4 is suspended from the supporting structure of the machine in a known manner by means of a drive spindle 12 which passes through the aperture 10 and is fixedly connected to the bottom wall 8 by means of three equiangularly spaced spokes 14 which are integral with the bottom wall 8 is in the opening 10, and of which only one is seen in FIG. 1. An annular valve 16 of approximately frusto-conical shape sealingly engages the bottom wall 8 about the outer circular edge of the aperture 10 in the position of the valve which is shown in fully drawn lines in FIG. 1.

When it is desired to open the aperture 10, the valve 16 is axially lifted to a position indicated by chain dotted outlines. The lifting mechansim includes a tube 18 which coaxially envelops the spindle 12, bushings 20 and 22 of anti-friction material being radially interposed between the tube and spindle to permit their relative axial and angular movement.

Figure 3:
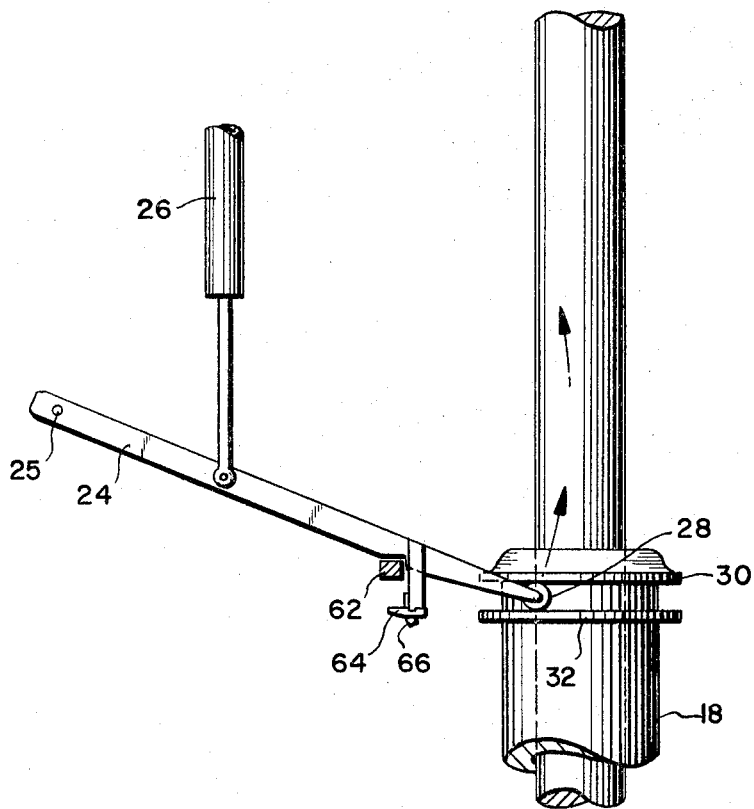
FIG. 3 is a side-elevational view of a detail of the machine of FIG. 1.

As shown in FIG. 3, the axial movement of the tube 18 is actuated by a lifting arm 24 one end of which is mounted on the stationary machine structure by means of a pivot pin 25. The central portion of the arm 24 is hingedly attached to a fluid-pressure operated jack 26. The free end of the arm 24 is forked, and each branch carries a wheel 28 which is received in a circumferential track on the tube 18 formed between a fixed collar 32 and an annular cap 30 on the upper end of the tube 18.

Reverting to FIG. 1, there is seen a detent 34 pivotally mounted on the bushing 20 and held in place by the cap 30. The detent is arranged in a manner more fully described in French Patent No. 1,246,748 to engage a circumferential groove 35 in the spindle 12 under centrifugal forces sufficient to overcome the restraint of a non-illustrated return spring, the spring being selected to disengage the detent 34 from the groove 35 at a basket speed of approximately 100 revolutions per minute or less, thus preventing the valve 16 from being lifted while the basket rotates at full speed.

The scraping blade 36 of the permanently installed plow assembly is fixedly mounted on the lower end of a rod 38 whose upper end is fastened to the cylinder 40 of a pneumatic actuator or jack 42. The lower end of the actuator 42 is axially slidably and rotatably mounted on the stationary curb 2 by means of a bracket 44 and a bearing 46. The piston 48 of the actuator is mounted on a hollow piston rod 50 which is fixedly fastened to the stationary support structure by a frame 52 attached to the bracket 44.

The piston 48 axially divides the interior of the cylinder 40 into an upper chamber 54 which permanently communicates with a compressed air line in a manner not further illustrated, and a lower chamber 56 which communicates with the air line through the axial bore of the piston rod 50 and a non-illustrated solenoid valve, and may be vented by the valve.

The cylinder 40 has an axial groove 57 in its outer wall. A sleeve 58 secured against axial movement on the bracket 44 slidably receives the cylinder 40 and is coupled to the cylinder for joint rotation by a key 59 which engages groove 57. A double-acting pneumatic actuator 60 has a cylinder pivotally mounted on the bracket 44 whereas its piston is hingedly linked to the sleeve 58 for swinging the cylinder 40 and the attached plow blade 36 through an angle of about 30 degrees. The pressure-fluid circuit of the actuator 60 has not been shown since it may be entirely conventional. It will be understood to include a solenoid-operated control valve.

Figure 2:
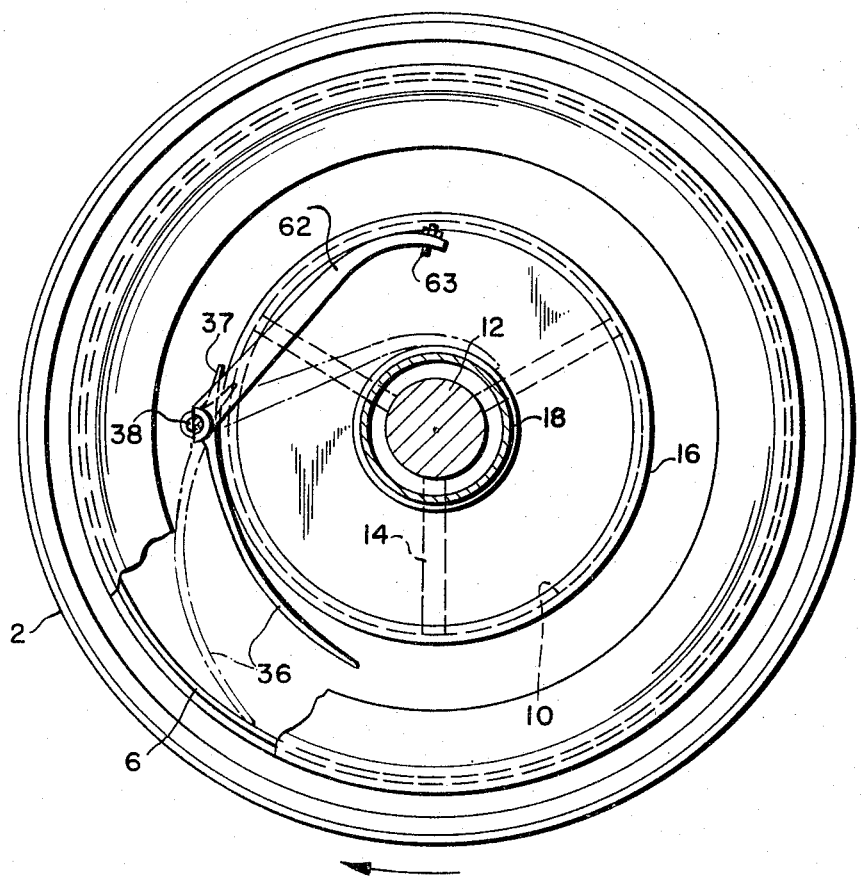
FIG. 2 shows the machine in FIG. 1 in fragmentary plan section on the line II—II.

A guide arm 62 is keyed to the rod 38, and its free end carries a threadedly adjustable stop 63. As is seen in FIG. 2, the actuator 60 pivots the plow assembly between an inoperative position shown in fully drawn lines, and an operative position indicated in chain dotted lines. The plow blade 36 is of arcuate shape and extends from its pivot axis in two directions. The trailing portion 37, as considered with reference to the direction of basket rotation indicated by an arrow, is much shorter than the leading portion. In the inoperative position of the plow assembly, the blade 36 is entirely outside the axial path of the valve 16 and is spaced from the axially and circumferentially extending wall 6 of the basket. The stop 63 is remote from the tube 18. In the operative position of the plow assembly, the leading portion of the blade 36 scrapes the wall 6, the trailing portion 37 extends into the path of the valve 16, and a part of the trailing portion is axially aligned with the aperture 10. The stop 63 movably engages the tube 18, and holds the leading portion of the blade in proper engagement with the wall 6 under the resilient pressure of the air in the actuator 60 even if the basket is unevenly loaded and does not rotate about its precise geometrical axis.

As is seen from FIG. 2, the arm 62 projects into the path of the valve 16 in all operative positions of the plow assembly, and blocking means are provided for preventing collisions between the valve 16 and the arm 62 or any other portions of the lifting mechanism.

The central portion of the lifting arm 24 carries a downwardly projecting lug 64 on which a spring loaded click 66 is pivotally mounted. The spring urges the click 66 into the position illustrated in FIG. 3 in which the click projects from the lug 64 approximately toward the pivot pin 25. The click may swing clockwise from the illustrated position against the restraint of its biasing spring but is prevented from counter-clockwise movement by abutment against the lug 64.

When the plow assembly is in the top position shown in FIG. 1 and the valve 16 engages the bottom wall 8, the arm 62 is located between the top face of the click 66 and the underside of the lifting arm 24 which prevent movement of the plow assembly in the direction of the basket axis. The lug 64 laterally abuts against the arm 62 and prevents swinging movement of the plow assembly from the inoperative to the operative position. When the jack 26 lifts the valve 16, the arm 24, the lug 64 and the click 66 move arcuately about the pin 25. During the counterclockwise movement of the lifting arm 24, as viewed in FIG. 2, the click 66 avoids the arm 62. The click 66 does not interfere with upward movement of the arm 62 into the illustrated position.

The centrifugal machine described is operated as follows:

The basket 4 is charged with slurry while the valve 16, the plow assembly and associated devices are in the position shown in FIG. 1 in fully drawn lines. The plow assembly is held in its raised position by the permanent air pressure in the chamber 54 while the chamber 56 is being vented to the atmosphere by its non-illustrated solenoid valve.

The basket 4 is rotated by a non-illustrated motor mounted on the stationary machine structure and coupled to the shaft 12. The centrifugal forces produced drive liquid from the slurry through a non-illustrated filter medium and the perforations of the basket wall 6, and also hold the detent 34 in the groove 35, thereby securing the valve 16 in its position of sealing engagement with the bottom wall 8. When a sufficient amount of liquid has been extracted, a non-illustrated brake is applied to the spindle 12, and the basket is slowly rotated by an auxiliary motor, not shown, at such a speed as to permit retraction of the detent 34 by its spring.

The jack 26 is supplied with pressure fluid to raise the arm 24 by means of a centrifugal switch coupled to the spindle 12 and a solenoid in the pressure circuit of the jack 26 and energized by the centrifugal switch in a manner not itself novel and not illustrated in the drawing.

When the valve 16 has been lifted to its topmost position indicated in chain-dotted lines, it actuates a limit-switch (not shown) in the circuit of the afore-mentioned solenoid valve which controls the actuator 60. The plow assembly is swung into its operative position, the trailing part of the blade 36 moves under the valve 16, and the stop 63 engages the tube 18 just above the valve.

The jack 26 is next vented by a timing relay (not shown) which also admits air to the lower chamber 56 of the cylinder 40. While the basket 4 slowly rotates, the blade 36 moves downward in a helical path relative to the wall 6, and scrapes the cake of solid material from the wall. The valve 16 rests on the trailing portion 37 of the plow blade and descends with the plow assembly.

The blade 36 ultimately abuts against the bottom wall 8 and scrapes the latter free of accumulated material to the very edge of the aperture 10. The trailing blade portion 37 overhangs the edge of the aperture. A limit switch and a timing relay (not shown) are employed for pivoting the blade 36 to its inoperative position with a sufficient delay after the blade 36 reaches the bottom wall 8 to ensure complete discharge of all loose solid material from the aperture 10. The chamber 56 is simultaneously vented, and the plow assembly reverts to its starting position after the trailing portion 37 of the blade 36 clears the valve 16.

While the plow moves upward in the basket 4, the latter may be washed, and a sensing element of a control apparatus (not shown) which limits charging of the basket with the next batch of slurry may be energized. The click 66 does not interfere with the return of the arm 62 to the position shown in FIG. 3.

The pneumatic and electrical controls employed for making the operating cycle of the machine fully independent of human intervention have not been shown since they are not themselves at the core of this invention. Automatic operation of the apparatus shown is possible because of the illustrated features described in more detail hereinabove.

The operating cycle of the centrifugal machine is very short because the blade 36 of the plow assembly is located within the basket 4 at all times. The blade can clear the entire area of the bottom wall 8, yet it does not interfere with speedy operation of the valve 16, nor does the valve interfere with the operation of the plow.

Various modifications are contemplated and may obviously be resorted to by those skilled in the art without departing from the spirit and scope of the invention hereinafter defined by the appended claims, as only a preferred embodiment thereof has been disclosed.

What I claimed is:
1. In a centrifugal machine, in combination:
   (a) a basket having
       (1) an axis,
       (2) an axially and circumferentially extending inner wall, and
       (3) a bottom wall transverse of said axis and formed with a central aperture;
   (b) drive means for rotating said basket, said drive means including a spindle member fixedly fastened to said bottom wall and having a portion axially coextensive with said inner wall;
   (c) a valve member adapted to close said aperture, said valve member having a radially outermost portion;
   (d) lifting means for moving said valve member in an axial path toward and away from a position of engagement with said bottom wall in which said outermost portion is at a predetermined distance from said axis and spaced radially outward from said aperture, said lifting means including a tubular member slidably enveloping said portion of said spindle member and having a terminal portion fixedly attached to said valve member;
   (e) plow means in said basket for scraping said walls and including a blade member;

(f) first plow actuating means for radially moving said plow means between an inoperative position in which said blade member clears said path, and an operative position in which a portion of said blade member extends into said path, and the spacing of said portion of the blade member from said axis is smaller than said predetermined distance, said actuating means including a stop member engageable with said tubular member toward said axis; and (g) second plow actuating means for axially moving said blade member toward and away from said bottom wall.

2. In a machine as set forth in claim 1, said blade member having another portion radially adjacent said inner wall in the operative position of said plow means and remote from said inner wall in said inoperative position.

3. In a machine as set forth in claim 2, said first plow actuating means including means for pivoting said plow means between said positions thereof.

4. In a machine as set forth in claim 1, said portion of said blade member being axially interposed between said valve member and said bottom wall when the valve member is away from said position of engagement, and when said plow means is in said operative position.

5. In a centrifugal machine, in combination:
 (a) a basket having
  (1) an axis,
  (2) an axially and circumferentially extending inner wall, and
  (3) a bottom wall transverse of said axis and formed with a central aperture;
 (b) drive means for rotating said basket, said drive means including a spindle member fixedly fastened to said bottom wall and having a portion axially coextensive with said inner wall;
 (c) a valve member adapted to close said aperture, said valve member having a radially outermost portion;
 (d) lifting means for moving said valve member in an axial path toward and away from a position of engagement with said bottom wall in which said outermost portion is at a predetermined distance from said axis and spaced radially outward from said aperture, said lifting means including a tubular member slidable enveloping said portion of said spindle member and having a terminal portion fixedly attached to said valve member;
 (e) plow means in said basket for scraping said walls and including a blade member;
 (f) first plow actuating means for radially moving said plow means between an inoperative position in which said blade member clears said path, and an operative position in which a portion of said blade member extends into said path, and the spacing of said portion of the blade member from said axis is smaller than said predetermined distance, said first actuating means including a stop member engageable with said tubular member toward said axis, and
 (g) second plow actuating means for axially moving said blade member toward and away from said bottom wall,
  (1) said lifting means including blocking means for blocking said first and second plow actuating means when said valve member is in said position of engagement.

6. In a machine as set forth in claim 5, a receptacle, said basket being arranged in said receptacle for rotation relative thereto, said drive means including a spindle member in said basket and coaxially fastened to said bottom wall, and a lifting arm arranged for pivotal movement about an axis fixed relative to said receptacle and engaging said tubular member for sliding the same axially on said spindle member when said lifting arm pivots about said axis, and said blocking means including cooperating abutment means on said lifting arm and on said plow means for preventing movement of the plow means actuated by said first and second actuating means when said valve member is in said position of engagement.

7. In a centrifugal machine, in combination:
 (a) a basket having an axis, an axially and circumferentially extending inner wall, and a bottom wall transverse of said axis and formed with a central aperture, said aperture having an outer edge spaced a predetermined distance from said axis;
 (b) drive means for rotating said basket about said axis;
 (c) plow means in said basket for scraping said walls, said plow means including a blade member, the axial height of said blade member being substantially smaller than the axial height of said inner wall;
 (d) first plow actuating means for radially moving said plow means between an inoperative position and an operative position;
 (e) second plow actuating means for axially moving said blade member between a lowered position contiguously adjacent said bottom wall and a raised position contiguously adjacent the axial end portion of said inner wall remote from said bottom wall;
 (f) a valve member adapted to close said aperture; and
 (g) lifting means for moving said valve member in an axial path from a position of engagement with said bottom wall in which the valve member radially extends beyond said predetermined distance to close said aperture to a lifted position in which the valve member is axially offset from said blade member in the raised position of the latter in a direction away from said bottom wall,
  (1) said blade member clearing said path when in said inoperative position thereof,
  (2) a portion of said blade member scrapingly engaging said inner wall, and another portion of said blade member being spaced from said axis a distance smaller than said predetermined distance when said blade member is in the operative position thereof.

8. In a machine as set forth in claim 7, said drive means including a spindle member fixedly fastened to said bottom wall and having a portion axially coextensive with said inner wall, said lifting means including a tubular member slidably enveloping said portion of said spindle member and having a terminal portion fixedly attached to said valve member, and said first plow actuating means including a stop member engageable with said tubular member toward said axis.

9. In a centrifugal machine, in combination:
 (a) a basket having an axis, an axially and circumferentially extending inner wall, and a bottom wall transverse of said axis and formed with a central aperture;
 (b) drive means for rotating said basket including a spindle member fixedly fastened to said bottom wall and having a portion axially coextensive with said wall;
 (c) a valve member adapted to close said aperture;
 (d) lifting means for moving said valve member in an axial path toward and away from a position of engagement with said bottom wall,
  (1) said lifting means including a tubular member slidably enveloping said portion of said spindle member and having a terminal portion fixedly attached to said valve member;
 (e) plow means in said basket for scraping said walls, said plow means including a blade member;
 (f) first plow actuating means for radially moving said plow means between an inoperative position in which said blade member is spaced from said inner wall, and an operative position of scraping engagement between said blade member and said inner wall, (1) said actuating means including a stop member engageable with said tubular member toward said axis; and (g) second plow actuating means for axially moving said blade member toward and away from said bottom wall.

10. In a machine as set forth in claim 9, said lifting means including blocking means for blocking said first and second plow actuating means when said valve member is in said position of engagement.

References Cited by the Examiner

UNITED STATES PATENTS

| | | | |
|---|---|---|---|
| 275,875 | 4/1883 | Weston | 210—375 X |
| 1,286,626 | 12/1918 | Herr | 210—375 X |
| 1,905,306 | 4/1933 | Roberts | 210—147 |
| 2,894,634 | 7/1959 | Lepoutre et al. | 210—375 |

REUBEN FRIEDMAN, *Primary Examiner.*

J. DE CESARE, *Assistant Examiner.*